United States Patent [19]

Frederiksen et al.

[11] 3,735,151

[45] May 22, 1973

[54] OUTPUT CIRCUIT FOR COMPARATORS

[75] Inventors: Thomas M. Frederiksen, Scottsdale; Ronald W. Russell, Mesa, both of Ariz.

[73] Assignee: Motorola, Inc., Franklin Park, Ill.

[22] Filed: Aug. 16, 1971

[21] Appl. No.: 171,994

[52] U.S. Cl................307/235 R, 307/270, 307/297, 307/299 B, 328/172, 330/30 D, 330/40

[51] Int. Cl............H03k 1/02, H03k 1/14, H03f 1/30

[58] Field of Search......................307/235, 270, 296, 307/297, 299, 237; 317/235 Z; 323/4, 9, 22 T; 328/172, 173, 175; 330/30 D, 40

[56] References Cited

UNITED STATES PATENTS

| | | | |
|---|---|---|---|
| 3,629,691 | 12/1971 | Wheatley, Jr. | 307/297 X |
| 3,555,402 | 1/1971 | Bozarth, Jr. et al. | 323/22 T X |
| 3,544,882 | 12/1970 | Tanaka | 307/296 X |
| 3,487,323 | 12/1969 | Schaefer | 307/235 X |
| 3,491,307 | 1/1970 | Solomon et al. | 330/30 D |
| 3,629,623 | 12/1971 | Sakurai | 323/22 T X |
| 3,629,692 | 12/1971 | Goyer | 307/297 X |
| 3,648,154 | 3/1972 | Frederiksen et al. | 323/22 T |

OTHER PUBLICATIONS

Hunter, Handbook of Semiconductor Electronics, pgs. 11–62 to 11–65 & 15–28 to 15–32. McGraw-Hill, Co. 3rd Ed., 1970.

Ottesen, "Precision Current Source Independent of Supply Voltage", IBM Technical Disclosure Bulletin, p. 874, Vol. 7., No. 10, 3/1965.

Woodard, "Constant Current Source Circuit", IBM Technical Disclosure Bulletin, p. 909–910, Vol. 13, No. 4; 9/1970.

*Primary Examiner*—John W. Huckert
*Assistant Examiner*—L. M. Anagnos
*Attorney*—Mueller & Aichele

[57] ABSTRACT

There is disclosed an output circuit for a comparator which operates, because of its high gain, as a switching circuit. It is the major feature of the output circuit that it operates such that the drive current for its output stage and the amount of load current it can sink are independent of supply voltage variations. Thus the output circuit is relatively unaffected by changes in, for instance, the output of a portable power supply such as a battery. Whenever an analog input level from the comparator is below a given level, the drive current is coupled to drive an output transistor into saturation. When the comparator changes state this drive current is shunted to ground through a transistor of the comparator circuit. Thus the output transistor acts as either an opened or closed switch capable of sinking a predetermined amount of current.

12 Claims, 4 Drawing Figures

Patented May 22, 1973

3,735,151

2 Sheets-Sheet 1

INVENTOR
Thomas M. Frederiksen
BY Ronald W. Russell
Mueller & Aichele
ATTY'S.

Patented May 22, 1973 3,735,151

2 Sheets-Sheet 2

INVENTOR

BY Thomas M. Frederiksen
Ronald W. Russell

Mueller & Aichele
ATTY'S.

OUTPUT CIRCUIT FOR COMPARATORS

BACKGROUND

This invention relates to output circuits and more particularly to an output circuit having a switching and current sinking function which are independent of the supply voltage to the circuit. Although the subject output circuit will be described in combination with a comparator circuit, the output circuit may be used after any emitter-follower type output circuit to provide a switching function and a current sinking function independent of supply voltage.

One of the problems in automotive circuitry is the variability of the automotive power supply voltage. Steady-state fluctuations in this power supply can be as great as 8 volts for a 12-volt system with transient voltages sometimes exceeding 30 volts. This is primarily due to the hostile environment of the engine well and to the large currents used in the ignition system of the automobile.

Increasing interest has recently been shown in utilizing sensitive electronic circuits within the motor well to sense various automotive parameters and to provide control signals for, for instance, regulating fuel injection to the engine. In addition such parameters as brake fluid pressure, and brake slippage are sensed and trouble lights activated when these systems are operating subnormally. However, variations in battery voltage make these type measurements difficult. Additionally, making a circuit which can sink a required maximum current is difficult because the current sinking ability of a circuit is usually dependent on supply voltage. Further, once a certain condition is indicated by a comparator used for making these sensitive measurements, there must be sufficient drive current in the output circuit to saturate an output transistor which in turn completes a given circuit. It will be obvious that an output circuit whose drive is independent of supply voltage can be used to reliably saturate this output transistor once a given condition is sensed. Further a circuit with both a drive current and current sinking independent of supply voltage has many uses both in and out of the automotive field.

With respect to current sinking independence, if the output circuit is to function as a switch completing a circuit from a load to ground it must also be able to sink or absorb a certain amount of load current. In order to guarantee that a circuit will sink a given amount of current, the amount of current that the output circuit can sink or handle must be known. Even if the amount of current that the circuit can sink is known, current limiting circuitry must be provided for excessive currents occasioned by unusually heavy loading conditions. While current limiting circuits are common, the amount of current they can sink or regulate is heavily dependent on the magnitude of the supply voltage. Changes of 30 volts or more supplied to conventional current limiting circuitry cuases the amount of current protection afforded by such current limiting circuitry to vary widely. Thus without some other provision, solid-state devices using conventional current limiting circuitry cannot reliably be used in the hostile environment of the engine well of an automobile because of supply voltage transients as well as steady-state vo'tage variations.

The subject output circuit and variations thereon basically solves the problem of the variability in current sinking ability by generating currents via a current source which is controlled by a voltage which is independent of the supply voltage. This voltage is generated by passing a constant current which is made independent of the supply voltage through a certain number of diodes to ground. It will be appreciated that a voltage tapped from this diode string does not change when V+ changes. This is because the voltage drop across each diode is held constant by the constant current. Thus the current in the output circuit does not change when V+ changes. This enables an accurate determination of the current sinking ability of a particular circuit and permits the design of output circuits which can handle various loading conditions. Three different output circuits will be described having capabilities of sinking 1 – 2 mils, 25 mils and 300 mils of current respectively irrespective of supply voltage.

With respect to drive current independence, the drive current for the output circuit is derived from a current source having a transistor biased with a voltage which is always a constant amount below the V+ power supply voltage.

In one configuration, the bias is on the base of this transistor with its emitter connected to V+. If this bias voltage tracks V+ at a fixed $\Delta V$ below V+, then the current generated by this type current source will be constant and thus independent of V+. Since the drive current is independent of supply voltage, this drive current can be used to reliably and selectively saturate an output transistor. The selective saturation of the output transistor permits the output circuit to function as a switching circuit.

In all of the circuits to be described there is a high gain stage which also cuases the output circuit to operate as a switch. The reason the circuits operate in an on-off manner is because the output transistor is made to saturate during appropriate input conditions and is rendered completely nonconducting under all other input conditions. The circuits are not true switches in the sense that in the subject circuit there is no feedback or latching circuitry. However because of the aforementioned constant current drive and high gain of the amplification stages used, the output circuits to be described approach a true switching function in that the output transistor is either fully saturated or rendered nonconductive. The output transistor thus functions as a switch. In all configurations to be described the output transistor is an NPN transistor with a grounded emitter. Its collector is brought out as a terminal and loads running between B+ and this terminal are activated whenever the output transistor is saturated. This configuration however may be altered such that a saturable transistor can be located anywhere in the load circuit.

SUMMARY

It is therefore an object of this invention to provide an improved output circuit.

It is a further object of this invention to provide an improved output circuit whose drive current and current sinking capability are relatively unaffected by changes in supply voltage.

It is another object of this invention to provide output circuitry which is driven by a current source whose output current is independent of power supply voltage and which has associated current limiting circuitry whose current limiting ability is also independent of power supply voltage.

It is still a further object of this invention to provide an improved output circuit which operates in a switching mode and changes state in response to analog input signals above or below a predetermined level.

Other objects and features of this invention will become more fully apparent upon reading the following description taken in connection with the accompanying drawings.

BRIEF DESCRIPTION OF THE INVENTION

There is disclosed an output circuit for a comparator which operates, because of its high gain, as a switching circuit. It is the major feature of the output circuit that it operates such that the drive current for its output stage and the amount of load current it can sink are independent of supply voltage variations. Thus the output circuit is relatively unaffected by changes in, for instance, the output of a portable power supply such as a battery. Whenever an analog input level from the comparator is below a given level, the drive current is coupled to drive an output transistor into saturation. When the comparator changes state this drive current is shunted to ground through a transistor of the comparator circuit. Thus the output transistor acts as either an opened or closed switch capable of sinking a predetermined amount of current.

DETAILED DESCRIPTION OF THE INVENTION

In addition to the problems just mentioned with respect to designing circuits for automotive applications is the problem of heat dissipation for the electronic circuits. These heating problems arise primarily because of the heavy currents which must be handled in the automotive system. The design of an output circuit for fabrication in integrated circuit form on a semiconductor chip must allow for a plurality of devices to be housed together in a single package. While heat dissipation may not be a problem with one individual circuit, it is a problem when more than one are encapsulated together. By making all currents to the output circuit independent of supply voltage the amount of current that such a circuit can sink is readily predictable. This permits the selection of the minimum rating output circuit for a given application thereby permitting the carrying of more circuits in a package. In one embodiment, when sinking large amounts of current, the power output transistor may be located off the chip so as not to increase the power dissipation problem.

It is therefore the independence of the output circuit current with respect to both steady-state and transient variations in the power supply voltage which enables comparators and other circuits to operate in automotive systems as reliable switching circuits of known current sinking capacity.

THE SPECIFIC EMBODIMENTS

When the term "constant current source" is used herein it refers to the fact that the current generated by a current source is made independent of supply voltage in addition to the fact that it is independent of the voltage at the node to which it is delivered. This latter function has previously been referred to as AC voltage independence of the current source.

Figure 1:
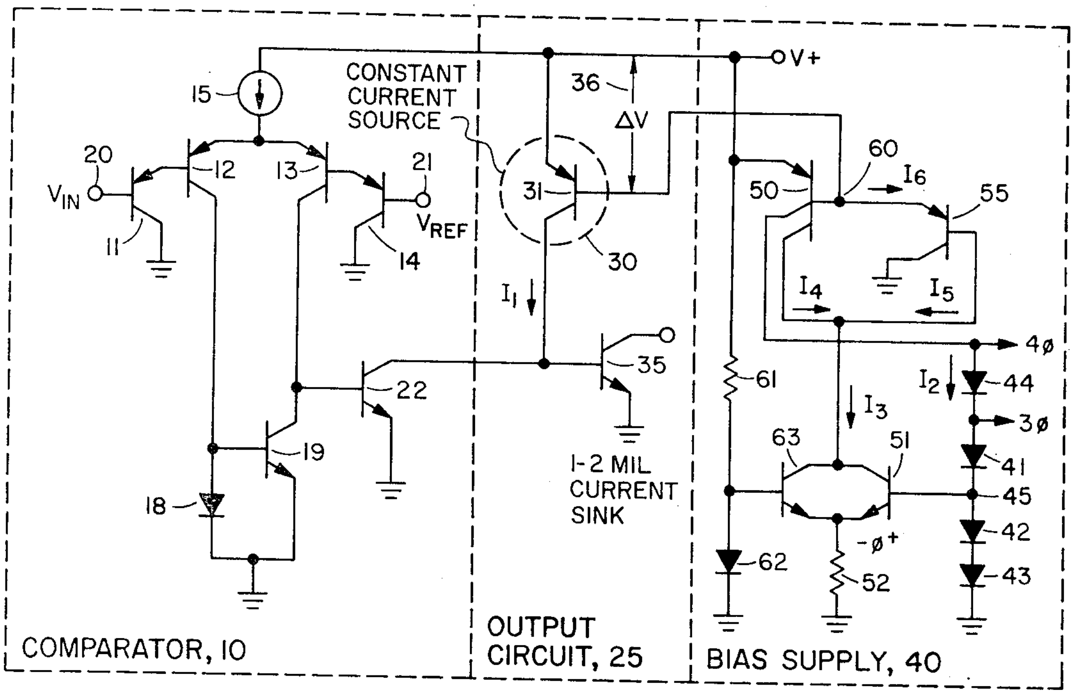
FIG. 1 is a schematic diagram of the subject output circuit in combination with a comparator circuit capable of sinking 1 – 2 mils of current, and showing a constant current source drive and biasing circuitry.

In the embodiment shown in FIG. 1 a comparator 10, driven by a current source 15, is shown comprised of a Darlington-coupled PNP differential amplifier composed of transistors 11 – 14. The differential output is converted by a differential-to-single-ended convertor composed of diode 18 and NPN transistor 19 to a single-ended output such that the voltage difference between $V_{ref}$ and $V_{in}$ at input terminals 20 and 21 is reflected in terms of a current at the collector of the transistor 19. This current drives an emitter-follower amplifier in the form of an emitter-grounded NPN transistor 22. The biasing on this transistor is such that when $V_{in} > V_{ref}$ this transistor is saturated. When $V_{in} < V_{ref}$, transistor 22 is rendered nonconductive. Thus the circuit operates as a comparator of $V_{in}$ with $V_{ref}$ and either saturates or renders nonconductive a transistor according to the relationship of $V_{in}$ and $V_{ref}$.

However the comparator circuit as just described cannot sink or absorb very much current as would exist if a low impedance load were to be connected between the collector of the transistor 22 and the V+ power supply. This sinking refers to the current which would be drawn through the differential amplifier and the differential-to-single-ended convertor in order to keep transistor 22 in a saturated condition.

The purpose of the subject output circuit is to make the drive to the saturable output transistor independent of supply voltage. It is also a purpose to make the amount of current that the output circuit can sink independent of the supply voltage.

CONSTANT CURRENT DRIVE

The first of these purposes is accomplished in the output circuit 25 of FIG. 1. In this output circuit a constant current source is shown by the dotted circle 30. It is in one embodiment a PNP transistor 31, with its base tied to a point ΔV below V+. It will be shown that the base of this transistor can be maintained ΔV below its emitter which is tied to V+ such that the current generated by this transistor is constant. This current is shown by the character $I_1$.

This $I_1$ constant current is toggled between the base of an output NPN transistor 35 and ground by the comparator's output transistor 22. The application of the current generated by the current source 30 to the base of the transistor 35 saturates it with a "constant current" (i.e., one whose magnitude is independent of V+) such that when $V_{in} < V_{ref}$, transistor 35 is saturated and such that when $V_{in} > V_{ref}$, transistor 35 is nonconductive. Thus when the drive to the output transistor is applied, it is constant in that it is independent of the supply voltage.

Not only has power supply independence been achieved, but transistor 35 also serves as an additional gain stage having an extremely high gain. This increases the switching characteristic of the circuit so it performs close to a true switching function without feedback circuits.

The maintainance of the base of the transistor 31 of the current source 30 at a fixed voltage with respect to V+ is shown by the bias supply circuit, 40, which operates as follows:

The Bias Supply

The purpose of the bias supply is two-fold. The first purpose is to supply a bias voltage which is independent of V+. This voltage will be used in connection with the circuit shown in FIG. 2. The second purpose is to generate a voltage which is a constant ΔV below V+ as shown by arrow 36. If ΔV is kept constant, the current, $I_1$, from current source 30 will be independent of V+ because the current generated by transistor 31 is directly proportional to its $V_{BE}$. If this $V_{BE}$ is in fact ΔV, then the current $I_1$ will be constant and independent of V+.

Assuming that transistor 50 is "on" and conducting, then a current $I_2$ flows from one of the two collectors of this transistor, through diodes 41, 42, 43 and 44 to ground. Each of these diodes has a voltage drop across it equal to $\phi$. Thus the voltage at a point 45 is $2\phi$ above ground. This voltage is coupled to one-half of a differential amplifier; that is, to the base of a transisotr 51. This turns the transistor 51 "on" such that the emitter current, $I_e$, of this transistor is equal to $\phi/R_e$ where $R_e$ is the value of a resistor 52 connected between the emitter of the transistor 51 and ground and $\phi$ is the $V_{BE}$ voltage drop of transistor 51. If the transistor 51 is a high gain transisor the collector current, $I_3$, will be approximately equal to $I_e$. Thus $I_3$ is controlled by $R_e$. With transistor 50 "on" the other of its collectors carries a current $I_4$ as shown. Normally the base of the transistor 50 would be tied to the lower collector of transistor 50. This however would introduce a base current component into the collector current. A transistor 55, coupled between the base and one collector of transistor 50, is used because of its high gain to reduce this base current component. Assigning a base current $I_5$ to transistor 55, $I_4 + I_5 = I_3$. However if there are not too many transistors coupled to the bias supply point 60 (the base of the transistor 50), the base current $I_5$ will be small as compared to $I_4$ because $I_5$ is equal to the base current of transistor 50 divided by the rather large $\beta$ of the transistor 55. This forces $I_4 = I_3 = \phi/R_e$ which shows that $I_4$ is independent of the supply voltage V+. If $I_4$ is independent of V+, $I_2$ will also be independent of V+ due to the symmetry of the PNP transistor. Since the emitter injection of transistor 50 is set by $I_4$ in a symmetrically arranged transistor, the emitter injection of transistor 50 is independent of V+. By making the emitter injection independent of V+, the current in the other collector is independent of V+. In other words, since the emitter injection is independent of V+, the total current $I_4 + I_2$ is independent of V+. Then since both the total current $(I_4 + I_2)$ and one component of this current $(I_4)$ are independent of V+, the other component $(I_2)$ is independent of V+. This would be true even if $I_2$ and $I_4$ were not equal as would be the case with different collector areas.

The independence of $I_2$ means that the current through the diodes 41, 42, 43 and 44 will be constant, thus providing constant voltage drops thereacross. For a constant $3\phi$ voltage, the voltage is tapped from the anode of the diode 41 as shown. For a constant $4\phi$ voltage, the voltage is tapped from the anode of diode 44.

In addition, since the collector flow from the transistor 50 is constant (i.e., $I_4 + I_2$) the current flow through the transistor 50 is constant making the base-to-emitter voltage of the transistor 50 constant and equal to $V_{BE}$ such that the base voltage is a constant ΔV below V+. This base voltage is however applied across the transistor 31. ΔV is constant because the current through the transistor 50 is constant. Thus when the bias voltage at point 60 is applied to the base of the transistor 31, the current $I_1$ is constant and independent of V+.

There is however a problem with the biasing circuit just described in that it is not self-starting. This is because of the complete V+ independence of the circuit which prevents the transistor 50 from being initially turned "on".

The starting circuitry is shown by a large valued resistor 61, diode 62, and transistor 63 which is the second half of the aforementioned differential amplifier.

Upon the application of V+ there exists a current through the resistor 61 and the diode 62. There exists by virtue of this current a $1\phi$ voltage at the base of the transistor 63 since the diode drop across the diode 62 is equal to $\phi$. This turns the transistor 63 "on" with a low state of conduction. Since the collectors of the transistors 63 and 51 are interconnected in the differential amplifier configuration shown, $I_3$ begins to flow bringing the transistor 50 and the transistor 55 into conduction. The voltage at the point 45 (the base of the transistor 51) rapidly rises to $2\phi$. When this occurs the voltage at the base of the transistor 51 is $2\phi$ and that at the base of the transistor 63 is $1\phi$. This causes the transistor 63 to turn "off" once the transistor 50 has been rendered conductive because of the differential amplifier action.

It will be appreciated that variations of V+ across the resistor 61 will not be transmitted to the bias supply because the transistor 63 is now "off". Thus the toggling of the differential amplifier shuts down the self-starting circuit once the transistor 50 has been rendered conductive.

CURRENT SINKING INDEPENDENCE

Figure 2:
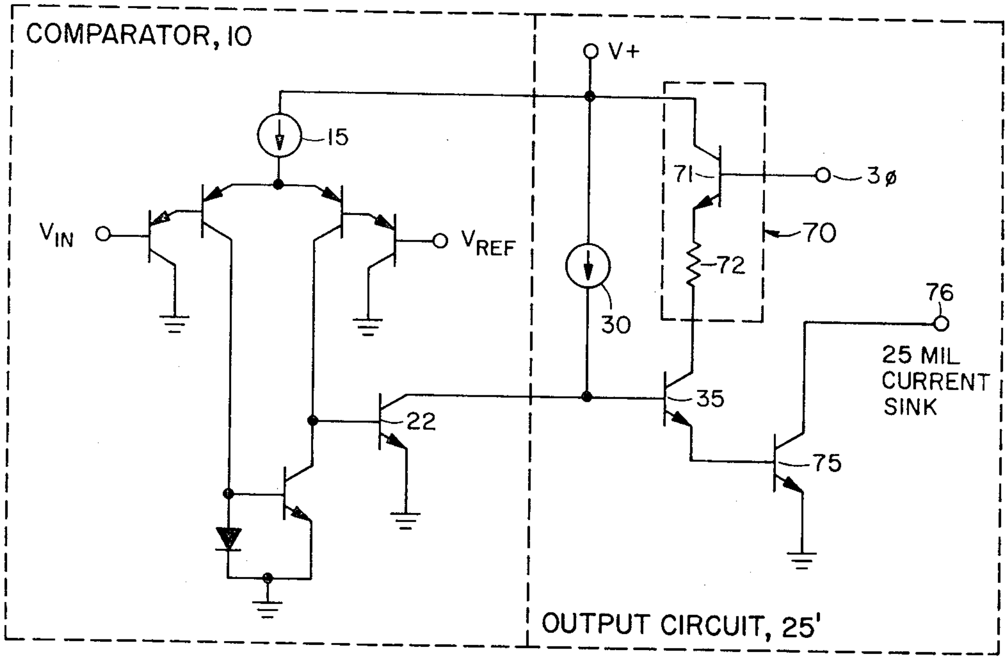
FIG. 2 is a schematic diagram of an output circuit capable of sinking up to 25 mils, showing current limiting circuitry which is biased with a voltage which is independent of the power supply voltage.

FIG. 2 illustrates a circuit in which current sinking independence has been added to the drive current independence associated with the circuit of FIG. 1. It will be noted that the output circuit in FIG. 1 has no current limiting circuitry, and for this reason it should only be used in applications where only 1 – 2 mils of load current is to be switched.

The circuit shown in FIG. 2 has an output circuit 25' equipped with a simple yet effective current limiting circuit shown in dotted box 70 to include a NPN transistor current source 71 in series with a resistor 72. Although the current through resistor 72 and transistor 71 is limited by the value, R, of the resistor, the primary control over the amount of current that can be generated at the emitter of transistor 71 is via the voltage applied to the base of this transistor. If this voltage is independent of the V+ supply the current generated by this current source is also independent of V+. If this current is independent of V+, the current limiting can be accurately set irrespective of V+ variations. Thus the current sinking ability of the circuit is uniquely defined.

The voltage delivered to the base of the transistor 71 is in fact independent of V+ if it is derived from the anode of any of the diodes 41, 42, 43 or 44 of the bias supply 40 of FIG. 1. In the configuration shown this voltage is 3$\phi$ above ground.

The output transistor 35 of FIG. 1 instead of having a grounded emitter, has its emitter coupled to the base of a further output transistor 75 which is saturated whenever transistor 35 is saturated. The transistor 75 has a grounded emitter and an output terminal 76 is connected to the collector of this transistor.

Now when transistor 75 is saturated, the voltage at the bottom of resistor 72 is $\phi$ corresponding to the $V_{be}$ of transistor 75. The voltage at the emitter of transistor 71 is 2$\phi$, the 3$\phi$ base voltage having been dropped to 2$\phi$ by the $V_{be}$ of the transistor 71. This means that there is a $\phi$ voltage differential across resistor 72 such that the maximum current drive to the base of the transistor 75 is $\phi$/R. Thus the base drive current is independent of V+. If this base drive is independent of V+, then the maximum amount of current that the transistor 75 can sink without going out of saturation is ($\phi$/R) $\beta_{75}$ where $\beta$ is the beta of the output transistor 75. Thus by adjusting the value of R, the output circuit can be made to sink a wide variety of currents, which ability to sink is independent of V+. If a load wants to draw more than that which the circuit is designed for, the output transistor merely comes out of saturation and limits the voltage to the load, thus protecting itself and the rest of the circuit from heavy current overload.

Figure 3:
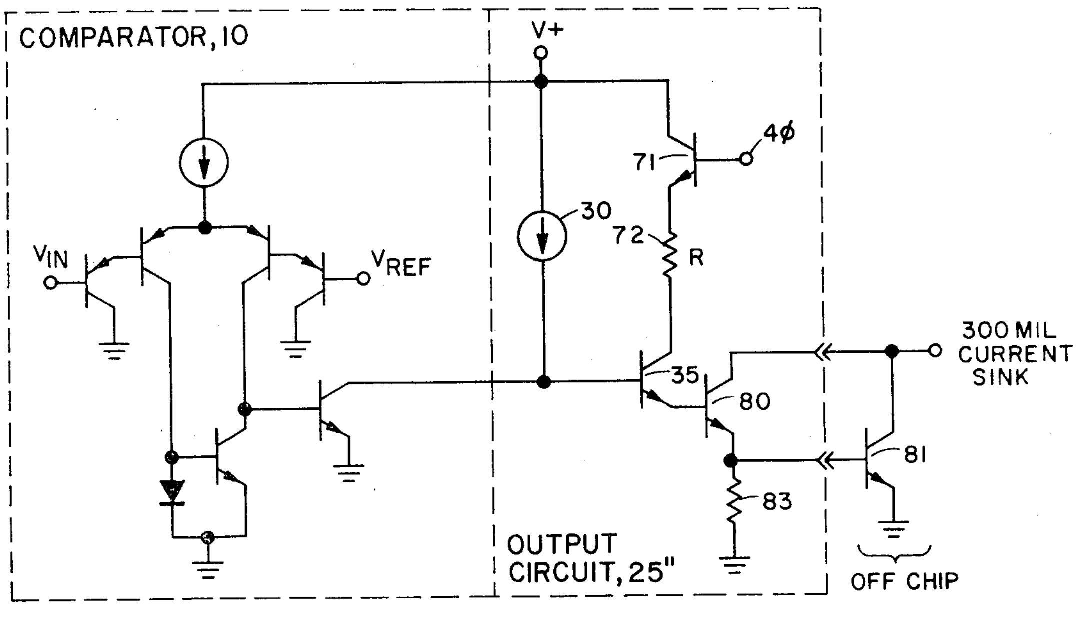
FIG. 3 is a schematic diagram of an output circuit capable of sinking up to 300 mils, showing a Darlington pair output configuration and the possibility of having one of the transistors of the Darlington pair on the chip and the other a high power transisotr located off the chip so as not to heat up the chip itself due to the passage of high currents.

If it is desirable to sink even more current, the output circuit 25'' shown in FIG. 3 may be used. Here the output is in the form of a Darlington pair, 80 and 81, with the emitter of transistor 35 coupled to the base of the Darlington drive transistor 80. The transistor 81 is a power transistor and may be located either on or off the chip. It is through this transistor that most of the load current goes. A portion of the load current equal to ($I_{load}/\beta_{81}$) is carried by the transistor 80. It can be seen that this current comes directly from the load and does not have to be supplied by the integrated circuit.

In the Darlington arrangement, transistor 81 is never fully saturated. However it still performs a switching function. If the collector of transistor 80 were to be directly coupled to V+ rather than to the load current, when turned "on" transistor 80 would overheat as a result of a large uncontrolled current and a large collector emitter voltage. For the case when transistor 81 is off the chip, an external resistor (not shown) from V+ to the collector lead of transistor 80 can be used to limit the current to a predetermined value. In this case the collector of transistor 80 is connected via this external resistor directly to V+ rather than being connected to the collector of transistor 81. In this figure the resistor 83 serves to prevent leakage currents from turning transistor 81 "on" and improves the breakdown rating of the power transistor. Also because of the additional output transistor 81, the voltage applied to the base of transistor 71 is 4$\phi$ derived from the anode of diode 44 of FIG. 1.

Here what has been accomplished in a circuit which permits the use of a high-power transistor which carries the majority of the load current. This high-power transistor may be located on the same chip as the output circuit or may be a separate discrete device to reduce heat dissipation in the integrated circuit.

However, as in the circuit of FIG. 2, the current that the entire output circuit can sink is independent of V+ since it uses the same current limiting circuitry 71 and 72 and since transistor 35 performs only a saturated switching function.

Combined Current Source

Figure 4:
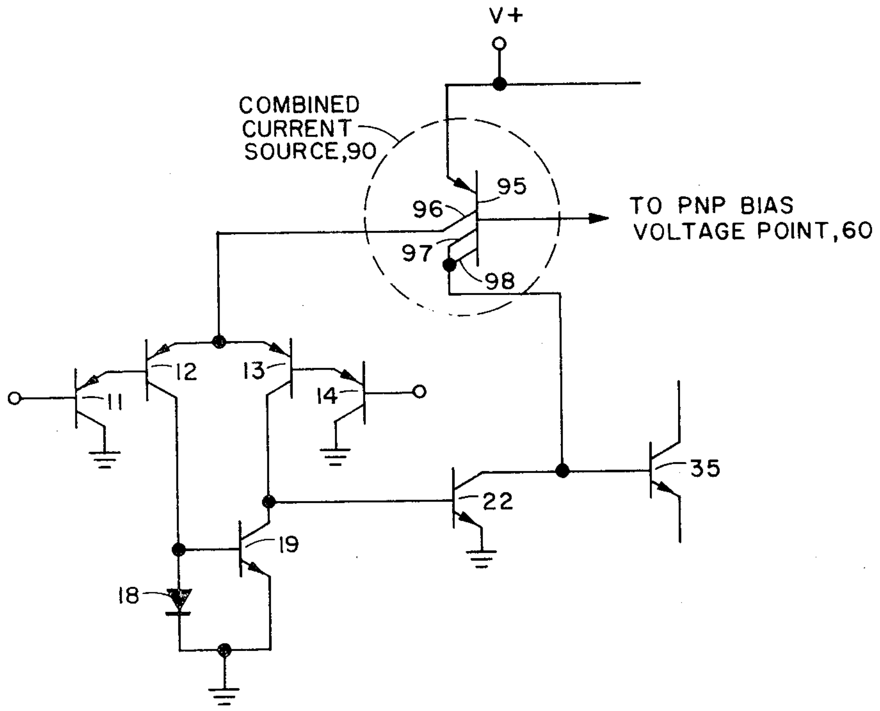
FIG. 4 is a schematic diagram of a current source capable of supplying "supply-indepdendent" currents both to the comparator circuit of FIG. 1 and the subject output circuit.

FIG. 4 illustrates a convenient way of providing both current source 30 and the current source 15 of the comparator 10. When the comparator utilizes this type current source, its performance will also be independent of the supply voltage V+. Thus the comparison of $V_{in}$ to $V_{ref}$ will be much more accurate than if a conventional current source having only AC independence were used for the comparator.

The combined current source is shown in FIG. 4 by the dotted circle 90 to be a triple-collector PNP transistor 95. A collector 96 is shown connected to the interconnected emitters of the transistors 12 and 13 of the comparator. Collectors 97 and 98 are tied together and generate the current drive for the base of the transistor 35 which in each of FIGS. 1 – 3 serves as a saturated switching device. The areas of the collectors of such a PNP transistor are usually made equal such that the current generated at collectors 97 and 98 is a multiple of that generated by the collector 96. In this manner twice the current is used to drive the output transistor as opposed to that necessary to ensure the proper functioning of the comparator.

If the emitter geometries of transistors 50 and 31 or 95 are identical then, because transistor 31 or transistor 95 has the same base-emitter voltage bias as transistor 50, the collector currents of either transistor 31 or transistor 95 can be readily calculated with reference to the current $I_4$ shown in FIG. 1 and the respective collector areas. However, $I_1$ will always be constant whether or not the characteristics of transistors 50 and 95 are matched since the voltage at point 60 tracks V+ by the $V_{BE}$ of transistor 50.

CONCLUSION

Thus there is provided a series of output circuits whose output characteristics, such as drive and power rating, do not vary with changes in the supply voltage, making the use of these circuits very attractive in applications utilizing portable power sources.

What is claimed is:

1. An output circuit for providing the saturation of an output transistor with a current whose magnitude is independent of a supply voltage comprising:

means coupled to said supply voltage for generating a current, said means including a second transistor;

a multiple-collector transistor, with the emitter of said multiple-collector transistor coupled to said supply voltage;

means coupled from one of said collectors to the other of said collectors for drawing a current from the other of said collectors, said current having a magnitude independent of said supply voltage, the current in the other of said collectors causing the current in said one collector to be independent of said supply voltage such that the current through said multiple-collector transistor is independent of said supply voltage, whereby the voltage at the base of said multiple-collector transistor tracks variations in said supply voltage at a fixed voltage therebeneath, the base of said multiple-collector transistor being coupled to the base of said second transistor such that the transistor in said current generating means generates a constant current; and means for connecting said generating means to the base of said saturable output transistor for providing current to said base of said saturable output transistor.

2. The circuit as recited in claim 1 and further including:

means for selectively shunting said current away from the base of said saturable output transistor whenever desired, whereby said saturable output transistor performs a switching function which is independent of supply voltage variations.

3. The circuit as recited in claim 1 and including a further output transistor wherein:

said saturable output transistor is used to drive said further output transistor into saturation, said circuit further including current limiting means, operating independently of variations in said supply voltage, said current limiting means including a current source having a third transistor and a resistor connected in series therewith between said supply voltage and one of the main electrodes of said saturable output transistor, with the other of the main electrodes of said saturable output transistor coupled to the base of said further output transistor; and means for providing a voltage independent of said supply voltage to the base of said third transistor whereby said current limiting means functions independently of said supply voltage such that the total amount of current that said output circuit can sink is independent of said supply voltage.

4. The circuit as recited in claim 3 wherein said means for providing a voltage independent of said supply voltage to the base of the transistor in said transistor current source includes:

a multiple-collector transistor, with the emitter of said multiple-collector transistor coupled to said supply voltage;

means coupled from one of said collectors to the other of said collectors for drawing a current in the other of said collectors having a magnitude independent of said supply voltage, the current in the other of said collectors causing the current in said one collector to be independent of said supply voltage; and resistive means interposed between said one collector and ground, the current through said resistive means being independent of said supply voltage whereby the voltage at the ungrounded end of said resistive means is independent of supply voltage because of the constant current therethrough, said ungrounded end being coupled to the base of the transistor in said transistor current source.

5. The circuit as recited in claim 3 further including:

a power transistor, said further output transistor being used to drive said power output transistor with one main electrode of said further output transistor coupled to the base of said power output transistor, whereby said power transistor carries the majority of any load current whenever a load is connected in series therewith between said supply voltage and ground.

6. The circuit as recited in claim 5 wherein said further output transistor and said power transistor are coupled in a Darlington configuration.

7. A switching circuit having a switching function independent of a supply voltage comprising in combination:

a comparator circuit for comparing an input signal with a reference voltage and for rendering conductive a first transistor whenever said input signal has a first predetermined relationship with said reference voltage; and an output circuit comprising:

means coupled to said supply voltage for generating a current, said means including a second transistor;

means for supplying the base of said second transistor with a voltage that is a fixed voltage below said supply voltage, the current generated by said current generating means being constant both with respect to AC signals and with respect to variations in said supply voltage;

a saturable output transistor;

means for connecting said generating means to the base of said saturable output transistor for providing current to said base of said saturable output transistor, and for connecting one of the main terminals of said first transistor to the base of said saturable output transistor and the other of the main terminals of said first transistor to ground, such that said first transistor shunts the current coupled to said saturable output transistor away from said saturable output transistor to ground whenever said first transistor is rendered conductive, whereby said saturable output transistor is saturated whenever said input signal is in a second predetermined relationship with respect to said reference voltage.

8. A bias supply circuit for providing voltages which are at a fixed potential below said supply voltage comprising:

a multiple-collector transistor, with the emitter of said multiple-collector transistor coupled to said supply voltage; and means coupled from one of the collectors of said transistor to the other of its collectors for drawing a current in the other of said collectors such that the magnitude of the current drawn is independent of said supply voltage, the current in the other of said collectors causing a carrier emission in said transistor such that current in said one of said collectors is independent of said supply voltage and such that the current through said multiple-collector transistor is constant with respect to variations in said supply voltage whereby the voltage at the base of said multiple-collector transistor tracks variations in said supply voltage at a fixed voltage therebeneath due to the constant current through said multiple-collector transistor, said base forming an output terminal for said bias supply having a voltage thereat at a fixed voltage below said supply voltage.

9. A bias supply for providing voltages which are independent of supply voltage changes comprising:

a multiple-collector transistor, with the emitter thereof coupled to said supply voltage;

means coupled from one of said collectors to the other of said collectors for drawing a current in the other of said collectors such that the magnitude of said current is independent of said supply voltage, the current in the other of said collectors causing the current in said one collector to be constant and independent of said supply voltage; and first resistance means coupled between said one collector and ground, the ungrounded side of said resistance means providing a voltage independent of variations in said supply voltage due to the constant current through said first resistance means.

10. The bias supply as recited in claim 9 wherein the voltage at the base of said multiple-collector transistor is a fixed amount below said supply voltage due to a constant current being drawn therethrough.

11. The bias supply as recited in claim 9 wherein said means for drawing a current includes:

a second transistor with its base coupled to the ungrounded end of said resistance means;

a second resistance means coupled between ground and one terminal of said second transistor, the other main terminal of said second transistor being coupled to the other of the collectors of said multiple-collector transistor; and a third transistor having its emitter coupled to the base of said multiple-collector transistor, its collector grounded and its base coupled to the other of the collectors of said multiple-collector transistor.

12. The bias supply as recited in claim 11 and further including a starter circuit comprising:

a third and fourth resistance means coupled in series between said supply voltage and ground; and a fourth transistor having its main electrodes coupled to corresponding main electrodes of said second transistor, and having its base coupled to the junction between said third and fourth resistance means, said second and fourth transistors functioning as a differential amplifier, said fourth resistance means having a value less than that of said first resistance means whereby said fourth transistor draws current until said second transistor is biased into conduction at which point said fourth transistor turns OFF due to differential transistor action.

* * * * *